Nov. 5, 1968       J. A. GULOTTA       3,409,422
     METHOD AND APPARATUS FOR FORMING A COMPOUND BEND IN
           A GLASS SHEET ON A GAS SUPPORT BED
Original Filed June 30, 1964                6 Sheets-Sheet 1

INVENTOR.
JOSEPH A. GULOTTA

INVENTOR.
JOSEPH A. GULOTTA

INVENTOR.
JOSEPH A. GULOTTA

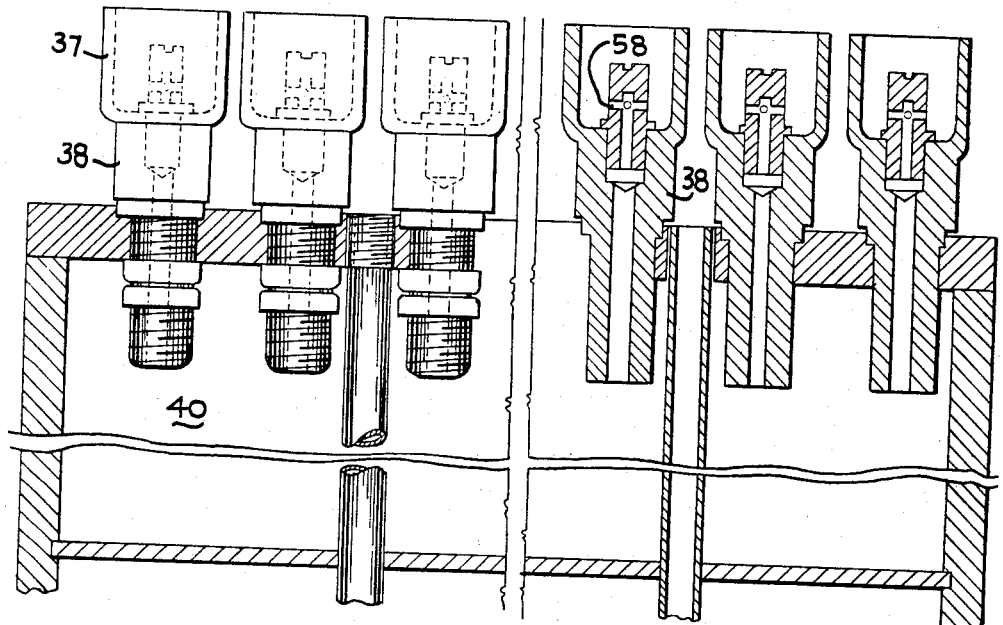
FIG. 5
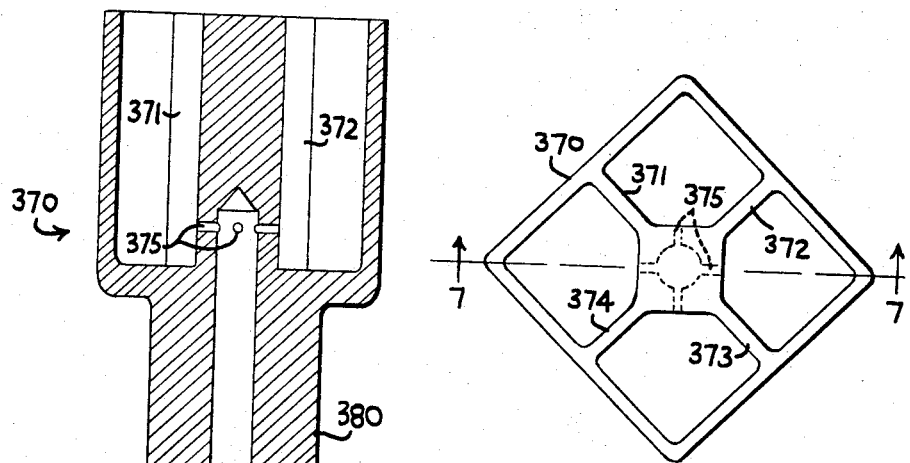
FIG. 7
FIG. 6
INVENTOR.
JOSEPH A. GULOTTA

INVENTOR.
JOSEPH A. GULOTTA

United States Patent Office 3,409,422
Patented Nov. 5, 1968

3,409,422
METHOD AND APPARATUS FOR FORMING A COMPOUND BEND IN A GLASS SHEET ON A GAS SUPPORT BED
Joseph A. Gulotta, New Kensington, Pa., assignor to PPG Industries Inc., a corporation of Pennsylvania
Continuation of application Ser. No. 379,108, June 30, 1964. This application Aug. 14, 1967, Ser. No. 660,469
3 Claims. (Cl. 65—25)

ABSTRACT OF THE DISCLOSURE

Glass sheets having a compound curvature composed of curves extending both transversely and longitudinally of the sheet are formed on an elongated support bed providing a gaseous support for the glass. The support bed forms a common surface of changing contour composed of an initial zone of flat configuration, a final zone having curves extending both longitudinally and transversely of the path of travel of the sheet and a transition zone of a configuration changing progressively from a flat surface to a curvature transversely of the path of travel of the sheet and, finally, to curvatures extending both transversely and longitudinally of the path of travel of the sheet. The apparatus is provided with means to heat the sheets to their deformation temperature on the support bed, a quenching zone beyond the support bed and means for conveying the sheets along the support bed into the quenching zone.

---

This application is a continuation of application Ser. No. 379,108 filed June 30, 1964, now abandoned.

This invention relates to the fabrication of glass and more particularly to the shaping and tempering of glass sheets.

There is a present demand, particularly in the automotive industry, for glass sheets of a compound curvature; that is sheets curved in the direction of their length as well as transversely thereof and therefore having no straight line elements. It is, of course, possible to bend glass sheets to such curvatures by pressing glass suspended by tongs with complimentary male-female solid molds. In addition, horizontal bending by gravity has been utilized using what is known as a "ring" mold contacting only the periphery of the glass being bent, the glass being allowed to sag to shape under the influence of heat and sometimes aided by moments of force applied through movable mold sections. One inherent disadvantage to such techniques is the necessity of contact between the glass sheet being bent and solid objects such as tongs or mold surfaces.

In accordance with the present invention, glass sheets are bent to a compound curvature while conveyed in continuous travel along a predetermined path. The sheets of glass are supported above a conveyor bed upon a fluid to prevent impairment of the sheet by contact with mechanical conveying elements. Glass sheets are heated to a deformation temperature while so supported and conveyed and their shape is changed by progressively changing the contour of the support bed along the path of glass travel.

In accordance with the present invention, each element of the sheet produced that extends in the direction of glass travel is curved and has a single radius. In addition, the sheet is curved in a direction transversely of the direction of travel. Such a compound curvature may be generated by relative motion between a sheet of glass and a support bed of the desired contour. Thus, a flat sheet heated to a deformation temperature may be changed to a compound curvature by conveying the sheet over a support bed that gradually changes from flat to a curvature corresponding to the desired shape of the finished sheet. Because of the single radius of curvature of each element of the sheet that extends in the direction of glass travel, the sheet, in its final shape, may be conveyed without a change in shape through a subsequent cooling zone. This invention, therefore, contemplates, as a preferred embodiment, a final shaping bed and cooling bed of a shape that is essentially toroidal; that is, conforming to a portion of a surface generated by the revolution of a plane closed curved about a straight line in the plane of said curve. To this end, the present invention contemplates a furnace with a flat preheat section such as a roller support, and an initial, flat gas support heating section; thereafter, a transition zone in which the gas support bed changes in contour both laterally and longitudinally of the path of travel to a final compound curvature; and next, a final hot shaping zone followed by a quenching zone having upper and lower opposed beds for emitting a cooling fluid. The final hot shaping zone bed and the quench zone beds are of curvatures conforming with that desired in the finished sheet of glass. Elements of the shaping and quenching zones extending in the direction of glass travel are of a single radius and the curvature of the beds transversely of the path of travel is fixed, but need not form a cylindrical contour (i.e., be of a single radius). The toroidal bed may provide a path of changing levels in a vertical direction (i.e., it may start level and bend downward in the direction of glass travel, or it may start upward and flat, curve toward the horizontal, reach a summit, and then continue downward, the latter embodiment being desirable where the radius of curvature is relatively short, because it minimizes the angle of any portion of the path with the horizon) or the bed may be on a single level, and curve laterally in the direction of glass travel, or may be a combination of the two.

The glass is heated in the preheat zone to a temperature somewhat below the temperature at which the glass deforms (the deformation temperature of commercial soda-lime-silica glass being approximately 980 degrees Fahrenheit considering the times contemplated in the present process) and is supported and conveyed on driven rolls. In the initial gas support heating section, the temperature of the glass is raised to a deformation temperature, for example, to about 1200 degrees Fahrenheit, by radiant heat applied from above and convective and radiant heat applied from below by the support bed and the support gas. The glass is conveyed through the gas support sections of the furnace by driven conveyor discs in peripheral contact with an edge surface of the glass sheet. The entire support bed is tilted in a sidewise direction at an angle of about 5 degrees with respect to the horizon to facilitate this manner of conveying. At the temperatures to which the glass sheets have been elevated in the initial gas support heating section, they readily conform to the shape of the support bed in the transition zone and final hot shaping zone. In the quenching section the glass sheets are cooled and tempered by opposing flows of cooling fluid, such as ambient air and, thereafter, are removed from the gas support in the shape generated by the support bed.

In accordance with an embodiment of the invention, there is provided a plurality of evenly distributed zones of uniform nominal pressure on the lower side of the sheet adequate to support the sheet element undergoing treatment. Gas flows from a reservoir under higher pressure into such zones, being uniformly throttled between the reservoir and each zone to restrict the passage of gas between the two. Each zone constitutes a unit of support area with respect to the sheet to be supported and each has a reference surface at its margin common to the remainder. Within each zone, gas entering from the reservoir is diffused after throttling so as to avoid creation of localized jets normal to the reference surface and otherwise to equalize pressure and flow under normal conditions of operation. Provision is made for escape of flow of gas emanating from each zone when covered by glass. In operation, the rate of flow of gas from the reservoir to each zone is maintained at such level that the average clearance between the reference surface and the glass sheet being supported is not less than 0.001 inch and not greater than 0.050 inch, normally not greater than 0.025 inch for glass having a thickness of ⅛ inch and above, and in any case never more than 50 to 90 percent of the thickness of the supported glass.

Advantageously, heating of glass upon the gas support is accomplished by burning a controlled admixture of gas and air, introducing the hot products of combustion to the reservoir or plenum chamber that supplies the supporting zones, and supplementing the heat thus supplied to the glass by heat such as radiant heat from independently controlled sources that are generally disposed on the side of the glass opposite the supported side.

The attendant advantages of this invention and the various embodiments thereof will be readily appreciated as the same become better understood by reference to the following detailed description when considered in connection with the accompanying drawings in which:

FIG. 5 is a detailed view, partly in section and partly in elevation, illustrating the module bed and the relationship of the modules to the plenum chamber and showing one embodiment of a module design;

FIG. 6 is a plan view illustrating a support module divided into separate subchambers;

FIG. 7 is a sectional view taken along the line 7—7 of FIG. 6; and

Figure 1:
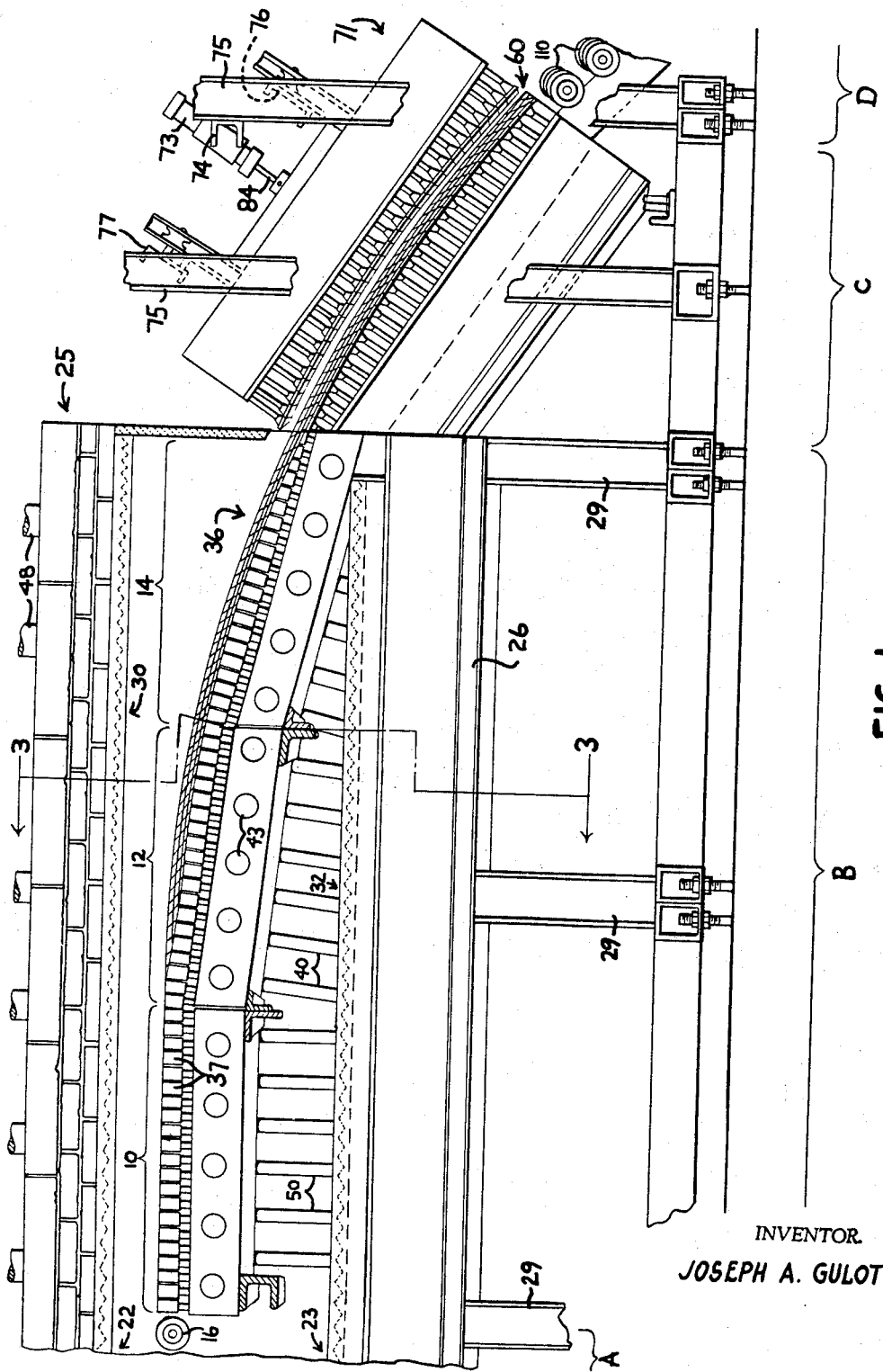
FIG. 1 is a side elevation partly schematic view, with parts removed and partially in section, illustrating a system for conveying, heating, bending and quenching sheet glass parts in accordance with the present invention.
Figure 2:
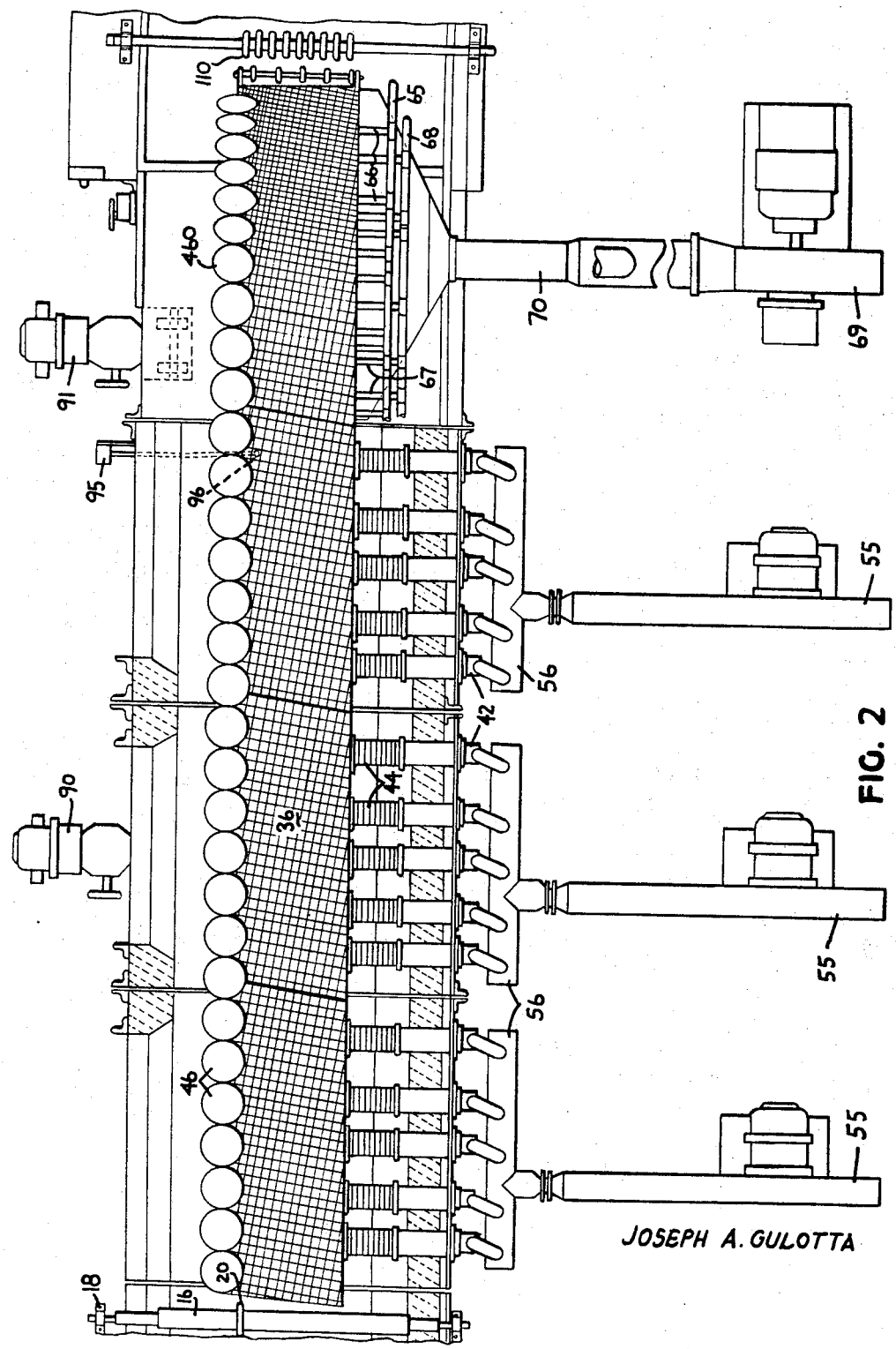
FIG. 2 is a partial plan view drawing the arrangement of the preheat section, heating and bending sections and quenching sections, the relative positions of the burners feeding combustion gases to the plenum chambers and the mechanism for conveying the glass sheets.

Referring to the drawings, FIGS. 1 and 2 illustrate a system advantageously employed for heating flat glass parts up to or above the deformation temperature, e.g., to a temperature at which the glass sheets can be bent and tempered, quenching such parts while hot and delivering the parts thus bent and tempered onto a roll conveyor for removal. The component sections making up the complete system consist of a roller preheat section A wherein the glass is conveyed on rollers between radiant heaters to preheat the glass until brought to a suitable preheat temperature under the deformation temperature; a gas film support heating section B, where the glass parts are transferred to, and supported on a flow of hot gas while being conveyed through a frictional drive contacting the edges only of such parts, supplemental heat being supplied by radiant heat sources above and below the glass until the glass reaches a temperature high enough for bending and tempering purposes; a quenching section C where the glass is rapidly chilled while suspended between opposed flows of cool air, edge contact driving being continued through the section; and a delivery roll system D that receives the bent and tempered glass parts from the quenching system and conveys them to their next destination. Heating section B includes a flat zone 10, a transition zone 12 and a final shaping zone 14 to progressively change the shape of the sheets from flat to a desired compound curvature.

The preheat section A is made up of a series of rolls 16 supported at each end in bearings 18 supported by longitudinally extending frame members. Each roll 16 includes a guide collar 20 in alignment throughout the preheat section so as to position the glass properly for transfer to the gas support next following. Each roll is driven in a conventional manner from a drive motor (not shown). A radiant roof 20 and a radiant floor 23 built up from individual electrical heating units supply heat to the preheat section.

Heating section B includes a furnace enclosure 25 fabricated within a supporting framework including girders 26, stanchions 27, and beams 28 supported by posts 29. A radiant roof 30 and radiant floor 32 with heating coil units 33 in ceramic holders 34 extend the length of furnace enclosure 25.

Figure 3:
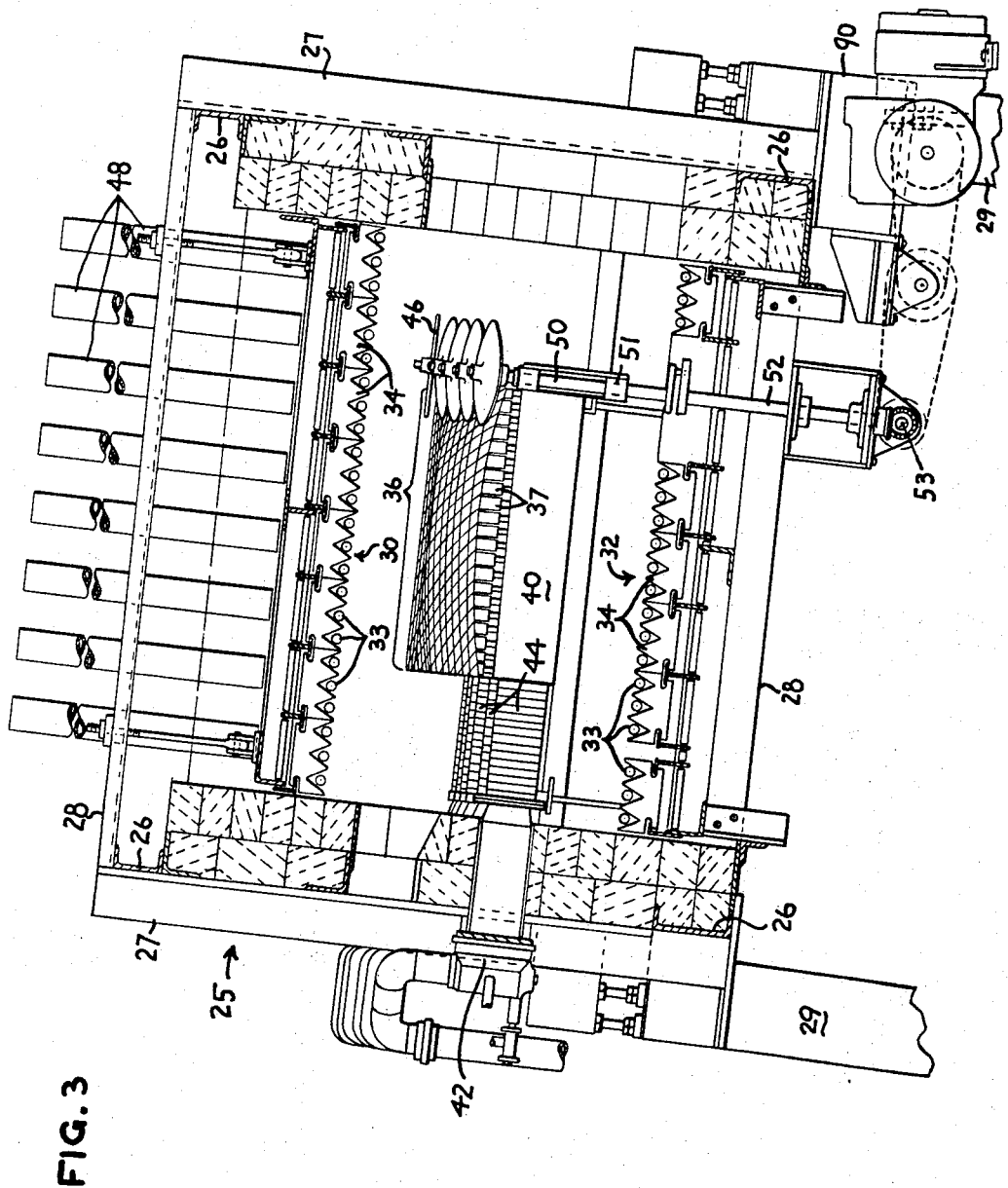
FIG. 3 is a detailed view partly in section and partly in elevation taken along the line 3—3 of FIG. 1.
Figure 4:
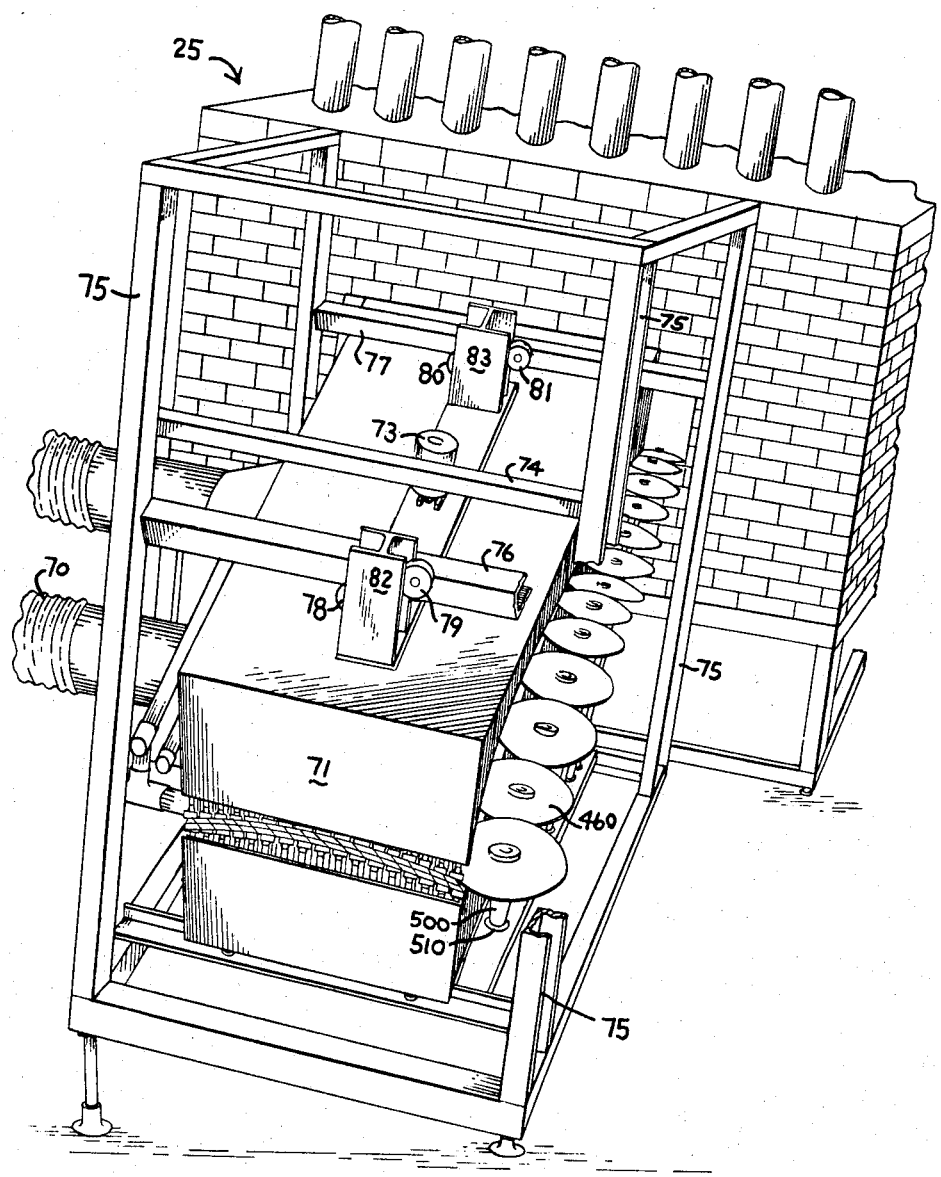
FIG. 4 is an end perspective, partly schematic, view illustrating the quenching section with parts of the subsequent delivery section removed.

As shown in FIGS. 1 to 3, within the funace enclosure 25 of heating section B there is a bed 36 of modules 37 in spaced but close juxtaposition each to the other and arranged geometrically like a mosaic. In the embodiment illustrated, all modules 37 have their upper termini of generally rectangular configuration and lying in a generative surface of predetermined contour. The modules 37 are arranged in successive rows crossing the intended path of travel of the workpiece, each row being at an angle other than 90 degrees from the path and spaced close to the next adjacent row. Each module 37 has a stem 38 of smaller cross sectional area than the upper terminus and each opens into a plenum chamber 40 positioned below the bed 36 and acting as a support therefor. See FIG. 2. Each module is substantially enclosed and separated from other modules by an exhaust zone.

The first section or flat zone 10 of the module bed is adjusted to such level that the plane of the upper termini of the modules lies parallel to, but just below by approximately the height of the gap between the modules and the support height of the glass sheet, the plane defined by the upper surfaces of the conveying rolls 16 in preheat section A. At one side, each plenum chamber 40 is in communication with five gas burners 42 through orifices 43 and flexible couplings 44. The gas support bed is tilted in a sidewise direction at an angle of approximately 5 degrees with respect to the horizon, as shown in FIG. 3. At the lower side of bed 36 a series of uniform disc-like driving members 46 extend inwardly and just above the bed to frictionally engage one edge only of the workpiece and convey it along the bed in continuous travel. A plurality of vents 48 project through the roof of furnace enclosure 25 to exhaust the interior to the atmosphere. Drive members 46 are mounted on shafts 50, journals 51 for which are supported by the supports for the plenum chambers. Each shaft 50 is driven through a coupling by a shaft 52 and a motor driven drive shaft 53. Radiant heat is supplied above and below the support bed 36 by radiant roof 30 and radiant floor 32. To supply air under pressure to the hot gas support combustion system, blowers feed air under pressure to manifolds 56 for each plenum chamber 40 and thence to gas burners 42. Gas is introduced into burners 42 through conduits, not shown. Each burner 42 is of the so called direct-fired, air-heater type. The combustion of the products in the combustion chamber of the burner produces sufficient plenum pressure to supply the modules with heated gas of uniform temperature and pressure.

Modules 37 forming the support bed 36 are shown in detail in FIG. 5. Each module 37 forms an open-top chamber. The upper terminus of each module defines a zone of substantially uniform pressure beneath a supported overlying sheet of glass. Pressure is exerted by gas supplied to each module 37 from the supporting plenum chamber 40 by way of the hollow supporting stem 38 and a plurality of orifices 58 communicating between each cavity and the hollow stem 42. Orifices 58 are disposed to prevent direct impingement of pressurized gaseous fluid against the supported glass surface and to assure that the gas introduced into each cavity diffuses into the gas already present, thus assuring uniform pressure across the upper edges of the module. Additionally, orifices 58 provide a drop in gas pressure from the interior of the plenum chamber to the interior of the module.

An alternative embodiment of a module 370 is shown in FIGS. 6 and 7. This module is similar to module 37 but is subdivided into four independent subchambers by walls 371, 372, 373 and 374. Separate orifices 375 communicate between a hollow stem 380 and each subchamber of the module so that each subchamber functions independently of the others. In this manner, support is provided when any one subchamber is covered with glass.

In zone 10 of the support bed, the modules are of equal height and provide a flat support bed for a sheet of glass to be supported upon a flow of gas from the modules. In final shaping zone 14, the height of individual modules varies and supporting plenum 40 is tilted downwardly in the direction of glass travel. The generative surface formed by the upper termini of the modules 37 in zone 14 is a section of a toroid formed by rotating a segment of a circle about an axis in the plane of said segment. Thus, a compound curvature of constant parameters is provided so that a sheet of glass conforming to one portion of the compound curvature conforms to any and all portions along the path of travel without undergoing a change in contour.

Between the flat support bed of the zone 10 and the toroidal-shaped bed of zone 14 is a transition zone 12 in which the surface contour formed by the upper termini of the modules 37 gradually changes from flat to a toroidal shape corresponding to the bed of zone 14. Thus, all portions of the transition zone 12 of the module bed 36 progressively depart in a vertical direction from a previous longitudinal collimation, both along the path of travel as well as transversely thereof. The arrangement is such that different portions of a supported sheet located across the sheet transversely of the path of travel depart from a previous collimation to different extents, and different portions of the sheet located in longitudinal alignment along the sheet in the direction of glass travel progressively depart to the same extent while the sheet is conveyed at a deformation temperature and changed from flat to curved. As shown in FIG. 1, the curvature of the bed is convex upward both transversely and longitudinally of the path of glass travel. The heights of the modules 37 are changed by reducing the depth of the module cavities and varying the lengths of stems 38 in varying degrees to gradually change the surface defined by the upper termini of the modules. In addition, the plenum chamber 40 is oriented, i.e., tilted in the direction of glass travel, to facilitate a gradual curvature of the module bed in the direction of glass travel. Because each module supports an overlying portion of the glass at a uniform distance from its terminus, the deformable glass will bend as it progresses, conforming to the shape of the bed.

Next adjacent the gas support heating section B in the direction of travel of the workpiece is quenching section C. See FIGS. 1, 2, 4 and 8. The quenching section C includes a curved bed of modules 60 arranged in mosaic pattern similar to that of the gas support heating bed. Each module 61 has a stem 62 smaller in cross section than the upper terminus and projecting through a cooling box 63 into a plenum chamber 64, the cooling box and upper surface of the plenum chamber acting as a support for the modules. The surface of the upper termini of the modules is adjusted to such level that it forms a continuation of the bed in the same toroidal contour as that of the end portion of the gas support heating bed next preceeding.

Heat exchange fluid, such as cooling water from an inlet manifold 65 (see FIG. 2) is introduced into the heat exchange box 63 through a plurality of pipes 66 and discharged through pipes 67 into an outlet manifold 68. Relatively cool gas, such as air at ambient temperature, is supplied to the plenum 64 via blower 69 and duct 70. A suitable valve within duct 70 controls the pressure and flow of air to the plenum.

Above the bed 60 and supported in such fashion as to be capable of being raised and lowered is a head assembly 71 (FIGS. 1 and 4) which in essence, constitutes a concave mirror image of the bed 60 and its associated heat exchange box 63 and plenum chamber 64 and which, in turn, is supplied separately with heat exchange fluid and air in like manner. Upper head assembly 71 is supported for vertical movement by fluid motor 73 attached to cross beam 74 fastened to stanchions 75. Two pairs of spaced cross beams 76 and 77 are provided, each supported by a pair of spaced stanchions 75. Two guide rollers 78 and 79 are rotatably attached to beam 76, offset horizontally with respect to beam 76 and offset vertically with respect to a guideway 82 upstanding from head assembly 71. In like manner, guide rollers 80 and 81 are rotatably attached to beam 77 and cooperate with a guideway 83 upstanding from head assembly 71 and spaced from guideway 82. This construction assures proper alignment of the upper module quench bed while providing vertical adjustment. In lower or working position, head assembly 70 rests on stops (not shown) providing means to level the head assembly and adjust the height with respect to the lower support bed 60. Fluid motor 73 serves to raise the head assembly 70 to the upper limit of travel of an associated piston rod 84 attached to head assembly 71, thereby permitting vertical adjustment and access to the module bed for cleaning, etc.

The conveying means for the quenching system includes disc-like driving members 460 having sufficiently narrow peripheral edges to extend inwardly and between the upper and lower module beds to frictionally engage one edge only of the workpiece and convey it along the bed in continous straight line travel. Driving members 460 are mounted on shafts 500, journals 510 for which are supported by the supports for the lower bed. Each shaft 500 and the last three shafts 50 closest to the quenching section are geared to and driven by a drive shaft that may be driven at normal speed by a motor 90 used to drive all conveying discs 46, or at a high speed by a motor 91. See FIG. 2. Thus, all drive members 46 and 460 are operated at normal conveying speed by motor 90. By a suitable drive shaft and clutch arrangement, the last three drive members of the heating section and the quench discs may be driven at a high speed by motor 91 while motor 90 continues to drive the remaining drive members at normal speed. Such high speed drive is controlled by a time operated control mechanism 95 actuated by a pressure sensing element 96 near the end of the heating section B. The sensing element is sensitive to the presence of a glass sheet in position to the transferred at a high speed to the quench. After a time interval sufficient to allow transfer of the glass sheet, the time operated control switches the drive of all drive members 46 and 460 back to normal speed motor 90.

Figure 8:
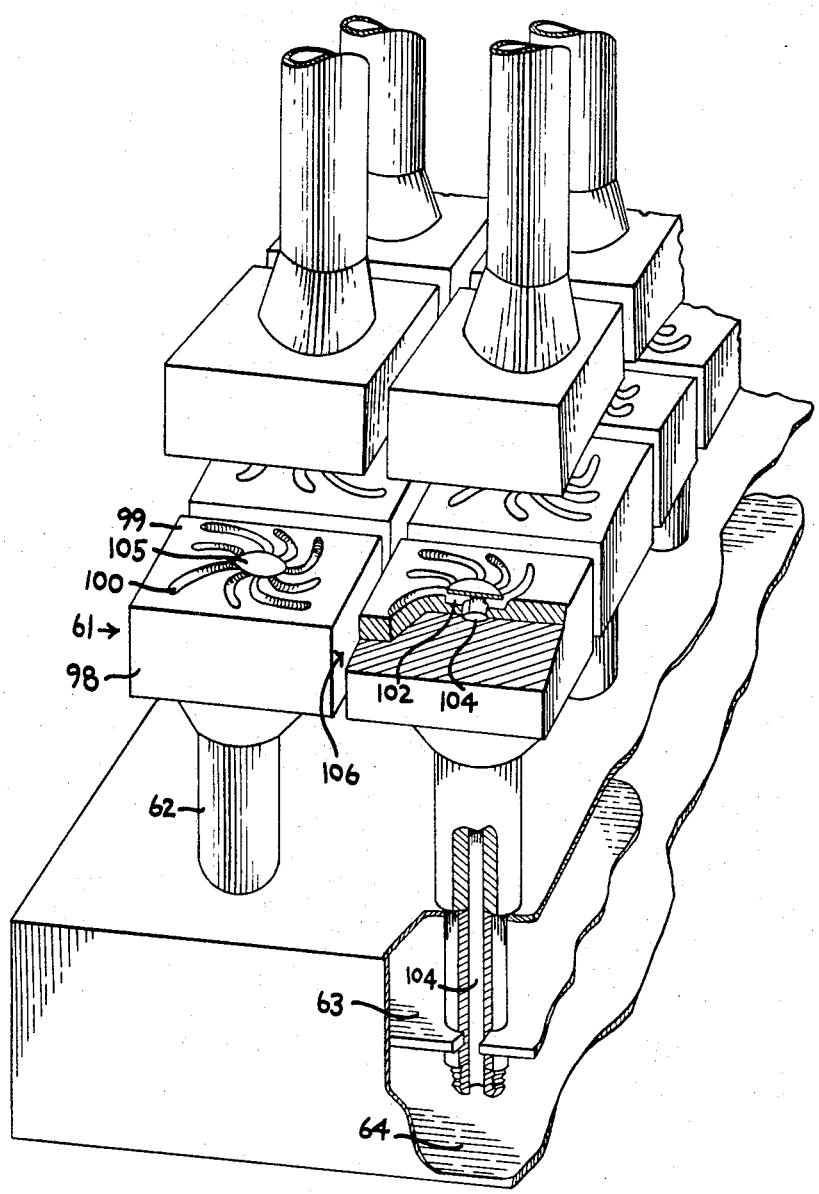
FIG. 8 is a perspective, partly schematic, view with parts broken away, illustrating the construction and arrangement of the module beds and individual modules of the quenching section.

Quench module 61 is shown in more detail in FIG. 8. Each module 61 includes a prismatic body portion 98 having an end surface or, in the position of the lower modules shown in FIG. 8, an upper surface 99 of generally rectangular configuration and containing a plurality of coplanar arcuate grooves 100 extending outwardly from a central part of the module at which location each groove communicates through a radial portion 102 with a central passageway 104 extending through the stem 62 and communicating with the plenum chamber 64. A fixed cap member 105 cooperates with radial groove portions 102 and central passageway 104 to form a restricted orifice for each groove 100. With this arrangement, gas from the plenum is fed under pressure to the centermost portion of each arcuate subdivision of the module and flows along the groove 100 while escaping over the walls thereof and across the upper surface 99 of the module 61 to exhaust zones 106 surrounding each individual module. When the modules are in close proximity to a sheet of material, the pressure of the gas within the grooves 100 and adjacent the surfaces 99 exerts a force against the sheet, thereby supporting the sheet between the upper and lower beds. With this arrangement, and particularly with close spacing between the modules and the sheet of glass, an extremely high rate of heat transfer between the adjacent sheet and the flowing gas is obtained.

As shown in FIGS. 1 and 2, the delivery roll system D consists of spaced, disc-like or donut-type conveyor elements 110 rotatable about curved support axles extending across the path of travel. The uppermost peripheral portions of the discs form spaced support points across the path of glass travel in a contour generally matching that of the final shape of the glass sheet. These conveyor discs are not driven. Rather, the movement of the glass sheet from the quenching section along a generally downhill path in the direction of glass travel provides sufficient momentum to remove the sheet from the exit of the quenching section.

OPERATION

The following is an example, by way of illustration only, of a preferred mode of operation of the invention disclosed herein as applied to the treatment of glass sheets:

Flat sheets of glass ¼ inch nominal thickness (0.240 inch) and approximately 15 inches wide by 30 inches long are placed lengthwise seriatim upon the rolls 16 of preheat section A, properly aligned by guide collars 20 and conveyed on the rolls 16 into and through the preheat section at a line speed of approximately 1.3 inches per second. Electrical heating coils 22 above and 23 below the moving glass supply heat to the preheat section at a sufficient rate to raise the temperature of the glass to approximately 950 degrees Fahrenheit surface temperature in approximately 15 feet of glass travel.

As the leading edge of the glass sheet leaves the last roll of the preheat section and progressively covers modules 37 forming support bed 36, the sheet becomes partly and finally fully supported by the uniform pressure of the gas emitted from the modules. The magnitude of this gas pressure is never large and, in any event, is held low enough and uniform enough from module to module so that it does not cause bowing or other deformation of the glass. Once the glass becomes gas supported, it is conveyed by edge contact through frictional engagement of its lower edge with rotating drive members 46. For this purpose, the entire system is positioned in a common plane tilted at an angle of 5 degrees with respect to the horizon to provide the glass with a component of force normal to the driving discs.

Gas burners 42 are supplied natural gas and air in proportions by volume of approximately 1 to 36, respectively, which includes 260 percent excess air over that required to provide complete combustion. The natural gas is provided at a rate of approximately 60 cubic feet per hour per square foot of bed. The products of combustion are introduced to the plenum chambers, producing therein a pressure of approximately 0.5 pound per square inch gauge. Each module includes orifices that reduce this pressure into the module cavities that are covered with glass to about 1/21 of the plenum pressure. Gas is introduced to the stem of each module at a temperature of 1200 degrees Fahrenheit and at a volume flow of approximately 1.3 cubic feet per minute.

The module bed in the heating section of this example is constructed of 120 modules per square foot in the manner shown in FIG. 5, and the upper terminus of each module forms a square, the outer sides of which are 1 inch long, the spacing between the walls of adjacent modules being 3/32 of an inch. Each wall is 1/16 inch thick.

The module bed is formed first flat and then, as illustrated in FIGS. 1 and 3, to present a gradually changing plane of support from one that is initially flat to one that is toroidal in contour. The surface conforms to a segment of a circular curve of 50 inch radius rotated with the center of the segment at a radial distance of 1440 inches about an axis in the plane of the curve. That is, the curvature of the final shaping zone 14 and quenching curvature bed 60 has a radius of curvature of 50 inches in the direction transversely of the path of glass travel and a radius of curvature of 1440 inches in the direction of glass travel. The change in contour from flat to curved begins approximately 60 inches from the beginning of the heating section B where the glass has attained a temperature level of about 1200 degrees Fahrenheit and is sufficiently deformable to readily follow the gradually changing contour of the module bed at the speed at which the glass is conveyed.

The nominal module support pressure when covered by the quarter inch thick glass is 0.023 pound per square inch above that existing above the glass, which provides a nominal spacing of 0.010 inch between the under side of the gas supported glass and the upper terminus of the module walls. The nominal exhaust pressure is substantially one atmosphere absolute.

To heat the glass, the supported gas is held at a temperature above that of the glass during the heating stage until the glass has reached the desired temperature. In this case, heat is added to the glass both convectively and radiantly from the module bed and the supporting gas, which are at a temperature of approximately 1200 degrees Fahrenheit, and is added radiantly into the chamber from ceiling heating coils 30 at a temperature above that of the glass, usually about 1300 degrees Fahrenheit. As glass is fed into the furnace, the heaters are actuated to supply heat as demands fluctuate. In this manner, the temperature of the glass is raised to approximately 1200 degrees Fahrenheit by the time it completes its travel through the fifteen foot length of the heating section. Radiant floor 32 beneath the plenum chamber supplies heat at about 1300 degrees Fahrenheit to help maintain the ambient heat level in the furnace chamber and keep the plenum boxes hot.

As the leading edge of the glass passes over the pressure sensing element 96 of a pressure switch on time operated mechanism 95, a timer on the mechanism begins to run. The timer is adjusted for the particular speed at which the glass sheet is being conveyed to actuate the high speed run out when the leading edge of the sheet reaches the end of the heating section. At this time the drive for the last three discs 46 of the heating section and all discs 460 of the quenching section changes from motor 90 to motor 91 through a suitable clutch and drive shaft arrangement. The glass sheet is rapidly conveyed from the heating section to the quenching section at a rate of approximately 10 inches per second. The time device then returns the drive to normal speed motor 90 and the glass is conveyed through the quenching section at the normal speed of 1.3 inches per second.

In the quenching section, air at ambient temperature of approximately 100 degrees Fahrenheit is supplied to upper and lower plenum chambers to provide plenum pressures of 4.5 and 3.4 ounces per square inch, respectively. Each module includes orifices that reduce this pressure to about 1/8 of the plenum pressure as the air escapes into the module cavities. The air is emitted at rates of 2.0 and 1.5 standard cubic feet per minute per module above and below the glass, respectively. Water is circulated through cooling boxes 63 at a flow rate of one gallon per minute per square foot of bed, the inlet temperature of the water being about 60 degrees Fahrenheit and outlet temperature being about 80 degrees Fahrenheit. Each quenching module bed of this example is formed of one inch square modules of the type shown in FIG. 8, the centers of which are spaced 1 3/16 inches apart. The average nominal spacings between the lower and upper surfaces of the glass supported between the quench beds and the respective lower and upper module surfaces is 0.010 inch and 0.050 inch, respectively.

The module rows of the quenching section are oriented at a slight angle, in this case 10 degrees, from normal to the path of travel to support the edges of the glass and to assure even cooling of the glass over the entire surface thereof, thereby minimizing the formation of an irridescent stress pattern in the glass.

The upper surface of the lower quenching bed formed by the upper termini of the modules is essentially a continuation of the contour of the final sizing zone of heating section B and, being a subsequent section of the toroidal generative surface, extends downwardly with respect to the horizon and in the direction of glass travel from the terminus of the heating section.

The glass travels through the seven feet of the quenching zone in approximately 30 seconds. In the initial 15 seconds, the temperature of the glass is lowered through the annealing range. In the remaining 15 seconds, the temperature of the glass is lowered to approximately 600 degrees Fahrenheit. The glass, at this point being no longer deformable, is conveyed from the air support of the quenching system to the rolls of the delivery system by discs 460 and thence to its destination.

Quarter-inch thick glass sheet so processed has a radius of curvature of 50 inches across the 15 inch width and a radius of curvature of 1440 inches along the 30 inch length. The glass is tempered and has a stress, in terms of the center tension thereof as indicated by the birefringent effect of the glass on polarized light waves, of approximately 3200 millimicrons per inch of glass length as measured by standard retardation techniques using a polariscope.

VARIATIONS AND OTHER EMBODIMENTS

While the apparatus and operating example disclosed above illustrate a preferred embodiment of this invention, it will be understood that other apparatus may be utilized and that the specific operating steps may be varied in many instances without departing from the inventive concept.

It should be understood that, while the configuration of the support bed disclosed herein is toroidal, the elemental transverse curvatures need not be right circular, but may be of some other form, such as a compound plane curve or a straight line. Furthermore, different portions of a toroidal bed may be used to produce different compound bends. For example, as already mentioned, the support portion of the bed may be located in a generally horizontal plane with the longitudinal curvature and the transverse curvature both being in the horizontal plane. That is, analogizing the toroidal portion of a support bed to a tire, while the first described embodiment provides a support bed corresponding to the tread portion of the upper part of a vertically oriented tire, it is also contemplated to provide a support bed corresponding to the sidewall portion of a generally horizontally oriented tire. In addition, it will be understood that the shape of the bed may include portions from both embodiments, gradually changing from one to the other so that, continuing the above analogy, the curved portion of the support bed may correspond first to the tread portion of a tire and then progressively to both the tread and the beginning of the sidewall. A sheet of deformable glass would be subjected to a continual change in shape during such travel as long as the bed presented a changing relationship from "tread" to "sidewall." Thus, once the desired shape is obtained, the remainder of the path would be maintained in the same configuration, i.e., all radii of curvature of the bed would remain constant. It will also be understood that shapes conforming to portions of a sphere, especially a sphere of large radius, may also be generated in the manner disclosed herein.

Other conveying means than the disclosed disc drive members may be utilized. For example, a continuous chain may run along one side of the support bed and conveying fingers extending therefrom above the surface of the bed may engage glass sheets to control their movement along the bed. With such an arrangement, the conveying bed need not be tilted in a sidewise direction with respect to the horizon.

The gas support bed may be constructed with modules of different design from those disclosed herein or may be constructed in an entirely different manner, as by utilizing a porous bed or perforated plate formed to the desired curvature. In addition, banks or sections of modules may be spaced from each other and curved, segmented idler rolls such as spaced donut rolls on a curved shaft extending transversely of the path of travel may be disposed between these sections so as to contact the lower surfaces of the glass sheets to partially support the sheets at spaced locations along the path of travel. Other fluids than gas may be used to heat, cool and support the glass; e.g., metals, such as molten tin, or molten salts may be used.

While in the disclosed embodiment, the glass sheets are tempered after being bent to the desired compound curvature, it will be understood that, if desired, the bent sheets may be partially tempered or annealed by providing more gradual cooling. In addition, the glass sheet may be coated prior to processing and the coating may be fused or otherwise cured during the heating operation as the glass sheets are being bent.

It should be evident from the above section that, while in the foregoing disclosure certain preferred embodiments of the invention have been disclosed, numerous modifications or alterations may be made therein without departing from the spirit and scope of the invention as set forth in the appended claims.

I claim:
1. Apparatus for generating a compound curvature in a flat sheet of glass while conveying said sheet along a selected path of travel which comprises;
   an elongated support bed including gas emitting means and gas exhaust means for providing fluid at a pressure sufficient to support said glass sheet,
   said support bed forming a common generative surface of changing contour comprising
   an initial zone of flat configuration,
   a final zone having a configuration of compound curvature composed of curvatures extending both transversely and longitudinally of said selected path of travel and
   a transition zone intermediate said initial and final zones of a configuration changing progressively from a flat configuration to an arcuate configuration curved transversely of said selected path of travel and, finally, a configuration of compound curvature composed of curvatures extending both transversely and longitudinally of said selected path of travel,
   means for heating said glass sheet on said support bed to at least its deformation temperature,
   a means for quenching said glass sheet of compound curvature disposed in said selected path of travel beyond said support bed, and
   means for conveying said gas-supported glass sheet along said support bed into said quenching zone.

2. An apparatus as defined in claim 1, wherein the curvatures of the compound curvature of said transition and final zones of said support bed extend downwardly both transversely and longitudinally of said selected path of travel.

3. A method of producing compound curvature in discrete flat glass sheets comprising the steps of;
   (1) applying heat to each discrete glass sheet until it is softened and deformable throughout,
   (2) moving each of said sheets through successive zones to impart a compound curvature to each of said sheets in each of said successive zones,
   (3) Applying a supporting force to the lower surface of each sheet in each of said successive zones, (4) selectively and progressively changing the points of application of said supporting forces applied to the lower surface of each said sheet in said successive zones to effect a progressive increase in the compound curvature of each of said sheets, (5) applying sufficient heat to the sheets in each of said successive zones to maintain the sheets in a heat softened and deformable condition so that each of said sheets conforms to the compound curvature effected by the supporting forces in each of said successive zones in which each of said sheets is disposed, (6) moving each of said sheets into a zone subsequent to the last of said successive zones, (7) maintaining in said subsequent zone the compound curvature of each of said sheets imparted to said sheet in the last of said successive zones, and (8) then applying a cooling fluid to the surfaces of each sheet in said subsequent zone in an amount sufficient to solidify said sheets and in a manner to maintain the compound curvature imparted thereto in the last of said successive zones.

References Cited

UNITED STATES PATENTS

| | | | |
|---|---|---|---|
| 3,332,760 | 7/1967 | McMaster et al. | 65—25 |
| 3,332,761 | 7/1967 | Fredley et al. | 65—25 |

DONALL H. SYLVESTER, *Primary Examiner.*

A. D. KELLOGG, *Assistant Examiner.*